(12) United States Patent
An et al.

(10) Patent No.: US 11,074,209 B2
(45) Date of Patent: Jul. 27, 2021

(54) TRANSCEIVER AND DRIVER ARCHITECTURE WITH LOW EMISSION AND HIGH INTERFERENCE TOLERANCE

(71) Applicant: Microchip Technology Incorporated, Chandler, AZ (US)

(72) Inventors: Hongming An, San Diego, CA (US); James Ho, San Diego, CA (US); Congqing Xiong, Shenzhen Guang (CN); Henry Liang, Guangdong (CN); John Junling Zang, Guangdong (CN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/588,562

(22) Filed: Sep. 30, 2019

(65) Prior Publication Data

US 2021/0056060 A1 Feb. 25, 2021

(30) Foreign Application Priority Data

Aug. 23, 2019 (CN) .......................... 201910784373.5

(51) Int. Cl.
*G06F 13/40* (2006.01)
*G06F 1/10* (2006.01)
(Continued)

(52) U.S. Cl.
CPC ............ *G06F 13/4022* (2013.01); *G06F 1/10* (2013.01); *G06F 9/30156* (2013.01); *G06F 9/4411* (2013.01); *G06F 13/4072* (2013.01)

(58) Field of Classification Search
CPC .... G06F 13/4022; G06F 1/10; G06F 9/30156; G06F 9/4411; G06F 13/4027
See application file for complete search history.

(56) References Cited

U.S. PATENT DOCUMENTS

| 4,970,466 A | 11/1990 | Bolles et al. |
| 5,357,145 A | 10/1994 | Segaram |

(Continued)

FOREIGN PATENT DOCUMENTS

| CN | 101127928 A | 2/2008 |
| EP | 0620664 | 10/1994 |

(Continued)

OTHER PUBLICATIONS

International Search Report from International Application No. PCT/US2020/070343, dated Jan. 13, 2021, 7 pages.

(Continued)

*Primary Examiner* — Glenn A. Auve
(74) *Attorney, Agent, or Firm* — TraskBritt (57) ABSTRACT

Circuitry of a physical layer for interfacing with a communication bus of a wired local area network is disclosed. The circuitry includes a variable delay driver operably coupled to a communication bus. The communication bus includes a shared transmission medium. The variable delay driver is configured to control a slew rate of a driven transmit signal at the driver output. The circuitry also includes receiver circuitry operably coupled to the communication bus. The circuitry further includes a common mode dimmer operably coupled to the receiver circuitry and the communication bus. The common mode dimmer is configured to protect the receiver circuitry from common mode interference.

27 Claims, 7 Drawing Sheets

(51) Int. Cl.
*G06F 9/4401* (2018.01)
*G06F 9/30* (2018.01)

(56) References Cited

U.S. PATENT DOCUMENTS

| | | | |
|---|---|---|---|
| 5,381,348 A | 1/1995 | Ernst et al. | |
| 5,784,573 A | 7/1998 | Szczepanek et al. | |
| 5,859,554 A * | 1/1999 | Higashisaka | H03K 5/131 |
| | | | 327/281 |
| 6,029,202 A | 2/2000 | Frazier et al. | |
| 6,215,816 B1 | 4/2001 | Gillespie et al. | |
| 6,459,739 B1 | 10/2002 | Vitenberg | |
| 6,479,983 B1 * | 11/2002 | Ebiya | G01R 31/3191 |
| | | | 324/762.01 |
| 6,691,241 B1 * | 2/2004 | Taylor | G06F 1/10 |
| | | | 713/400 |
| 6,735,217 B1 | 5/2004 | Webber, Jr. et al. | |
| 6,920,132 B1 | 7/2005 | Lo | |
| 6,973,094 B1 | 12/2005 | Holloway et al. | |
| 7,110,423 B1 | 9/2006 | Sethuram | |
| 7,558,348 B1 | 7/2009 | Liu et al. | |
| 8,243,752 B2 | 8/2012 | Barkan et al. | |
| 8,935,125 B1 | 1/2015 | Fu et al. | |
| 9,628,082 B1 | 4/2017 | Smith et al. | |
| 10,684,977 B1 | 6/2020 | Seger et al. | |
| 2003/0061341 A1 | 3/2003 | Loh et al. | |
| 2003/0200306 A1 | 10/2003 | Park et al. | |
| 2003/0225802 A1 | 12/2003 | Ruthstein et al. | |
| 2004/0240598 A1 | 12/2004 | Yin | |
| 2004/0251912 A1 | 12/2004 | Pharn et al. | |
| 2005/0078683 A1 | 4/2005 | Page | |
| 2005/0128826 A1 * | 6/2005 | Kwack | G11C 7/1066 |
| | | | 365/194 |
| 2006/0109784 A1 | 5/2006 | Weller et al. | |
| 2006/0181283 A1 | 8/2006 | Wajcer et al. | |
| 2006/0209710 A1 * | 9/2006 | Watanabe | H04L 1/24 |
| | | | 370/252 |
| 2007/0121624 A1 | 5/2007 | Kimbrough et al. | |
| 2007/0133586 A1 | 6/2007 | Ojard et al. | |
| 2007/0160087 A1 | 7/2007 | Findlater et al. | |
| 2008/0024178 A1 * | 1/2008 | Kim | H03K 19/018528 |
| | | | 327/108 |
| 2008/0037693 A1 | 2/2008 | Andrus et al. | |
| 2008/0159330 A1 | 7/2008 | Deng et al. | |
| 2008/0186996 A1 | 8/2008 | Powell et al. | |
| 2009/0003835 A1 | 1/2009 | Arahira | |
| 2009/0201936 A1 | 8/2009 | Dumet et al. | |
| 2011/0170476 A1 | 7/2011 | Shapira et al. | |
| 2012/0087662 A1 | 4/2012 | Suzuki et al. | |
| 2012/0229214 A1 | 9/2012 | Kasanyal | |
| 2012/0307637 A1 | 12/2012 | Diab | |
| 2013/0021063 A1 * | 1/2013 | Kwon | G11C 7/222 |
| | | | 326/82 |
| 2013/0101058 A1 | 4/2013 | Hummel | |
| 2013/0229926 A1 | 9/2013 | Lu et al. | |
| 2013/0329773 A1 | 12/2013 | Cheng et al. | |
| 2014/0073352 A1 | 3/2014 | Aldana et al. | |
| 2014/0268141 A1 | 9/2014 | Pariseau | |
| 2015/0063375 A1 | 3/2015 | Tzeng et al. | |
| 2015/0124797 A1 | 5/2015 | Babitch et al. | |
| 2015/0131708 A1 | 5/2015 | Cornett et al. | |
| 2015/0145563 A1 | 5/2015 | Pardoen | |
| 2015/0145581 A1 * | 5/2015 | Palmer | H03K 5/135 |
| | | | 327/262 |
| 2015/0237178 A1 | 8/2015 | Zhang | |
| 2016/0094362 A1 | 3/2016 | Brennan | |
| 2016/0323287 A1 | 11/2016 | Kishikawa et al. | |
| 2017/0111069 A1 | 4/2017 | Dafesh et al. | |
| 2018/0034658 A1 | 2/2018 | Kinage et al. | |
| 2018/0165056 A1 | 6/2018 | Lay et al. | |
| 2018/0181525 A1 | 6/2018 | Iyer et al. | |
| 2018/0262526 A1 | 9/2018 | Wang et al. | |
| 2018/0314285 A1 * | 11/2018 | Susanto | H04B 3/28 |
| 2019/0179398 A1 | 6/2019 | Arora et al. | |
| 2019/0230705 A1 | 7/2019 | Beruto et al. | |
| 2019/0261420 A1 | 8/2019 | Axer et al. | |
| 2019/0313446 A1 | 10/2019 | Kim et al. | |
| 2020/0351943 A1 | 11/2020 | Iyer et al. | |
| 2020/0371579 A1 | 11/2020 | Selvam et al. | |
| 2021/0055963 A1 | 2/2021 | An et al. | |
| 2021/0058168 A1 | 2/2021 | Zang et al. | |
| 2021/0058177 A1 | 2/2021 | Iyer et al. | |
| 2021/0058224 A1 | 2/2021 | Iyer et al. | |
| 2021/0058269 A1 | 2/2021 | Zang et al. | |
| 2021/0058498 A1 | 2/2021 | Iyer et al. | |
| 2021/0058965 A1 | 2/2021 | Chen et al. | |

FOREIGN PATENT DOCUMENTS

| | | |
|---|---|---|
| EP | 1388975 A1 | 2/2004 |
| EP | 1940086 A1 | 7/2008 |
| EP | 3094044 A1 | 11/2016 |

OTHER PUBLICATIONS

International Written Opinion from International Application No. PCT/US2020/070343, dated Jan. 13, 2021, 10 pages.

* cited by examiner

TRANSCEIVER AND DRIVER ARCHITECTURE WITH LOW EMISSION AND HIGH INTERFERENCE TOLERANCE

PRIORITY CLAIM

This application claims the benefit of the filing date of Chinese Patent Application Serial No. 201910784373.5, filed Aug. 23, 2019, for "TRANSCEIVER AND DRIVER ARCHITECTURE WITH LOW EMISSION AND HIGH INTERFERENCE TOLERANCE."

TECHNICAL FIELD

The present disclosure relates, generally, to transceivers and drivers with low emission and high interference tolerance; and more specifically still, some embodiments relate, generally, to transceivers and drivers for use in wired local area networks.

BACKGROUND

In certain environments in which wired local area networks (e.g., Ethernet) are used it may be desirable to provide robustness. One example is in automotive environments where automotive standards groups and the International Electrical and Electronics (IEEE) regulate standard specifications for operation of Ethernet devices. These standard specifications include standards including electromagnetic compatibility (EMC) and electromagnetic interference (EMI) requirements. Given the high level of interference and noise in the automotive environment, the standards for EMC and EMI are relatively stringent.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A vehicle, such as an automobile, a truck, a bus, a ship, and/or an aircraft, may include a vehicle communication network. The complexity of a vehicle communication network may vary depending on a number of electronic devices within the network. For example, an advanced vehicle communication network may include various control modules for, for example, engine control, transmission control, safety control (e.g., antilock braking), and emissions control. To support these modules, the automotive industry relies on various communication protocols.

10SPE (i.e., 10 Mbps Single Pair Ethernet) network technology specification currently under development by the Institute of Electrical and Electronic Engineers as specification IEEE 802.3Cg™. 10SPE may be used to provide a collision free, deterministic transmission on a multi-drop network. The 10SPE specification is driven by robustness (e.g., EMC/EMI requirements). For example, the 10SPE specification includes stringent automotive EMI standards. A relatively large degree of EMI and noise may be present in automotive environments. Design of a transceiver in wired local area networks often involves trade-offs between performance, chip area, power, risk, and robustness.

Embodiments of the disclosure enable transceivers in wired local area networks (e.g., Ethernet) to tolerate the interference and noise inherent to automotive environments, meet the relevant automotive and IEEE standards, support error free transmission and reception of differential signals, and support signal detection, diagnosis, sleep/wake-up functions, other functions, and combinations thereof.

Some embodiments disclosed herein relate to a transceiver architecture for automotive control networks. This architecture features a low-emission transmitter driver with multiple slew rate and multiple amplitude level control and a receiver that tolerates relatively high levels of interference and noise such as those inherent to the automotive environment. This architecture may also include common mode dimmer circuitry used to suppress the interference while drawing relatively low power. Signal and activity detection are also implemented for collision detection and prevention and cable fault (e.g., cable quality monitoring including short circuits, open circuits, other faults, or combinations thereof) detection, as well as wakeup of the network. The architecture achieves a high impedance idle state, assists in passing automotive tests and supports a diagnosis feature. While some embodiments disclosed herein are discussed in the specific context of automotive control networks, it will be understood that the embodiments disclosed herein are equally applicable to other industrial and server backplanes such as 10SPM for buildings, elevators, lighting, industrial in-field, Internet of Things (IoT), other applications, or combinations thereof.

Some embodiments disclosed herein relate to circuitry of a physical layer of a wired local area network. The circuitry includes a variable delay driver operably coupled to a communication bus. The variable delay driver includes sub-drivers operably coupled in parallel between a driver input of the variable delay driver and a driver output of the variable delay driver. The variable delay driver also includes one or more delay elements coupled between the driver input and one or more of the sub-drivers to deliver a transmit data signal to at least two of the sub-drivers at different points in time to control a slew rate of a driven transmit signal at the driver output. In some embodiments, at least one of the sub-drivers includes a high-speed input stage and a high-voltage intermediate stage. In some embodiments, the high-speed input stage includes high-speed transistors. In some embodiments, the high-voltage intermediate stage includes high-voltage transistors and diodes. In some embodiments, the circuitry further includes receiver circuitry operably coupled to the communication bus. In some embodiments, the receiver circuitry includes signal detect circuitry, reflection detect circuitry, sleep mode detect circuitry, collision detect circuitry, or combinations thereof. In some embodiments, the reflection detect circuitry is configured to detect shorts, open circuits, or both in the communication bus. In some embodiments, the receiver circuitry includes at least one receive amplifier. In some embodiments, the circuitry further includes a common mode dimmer configured to protect the receive circuitry from common mode interference. In some embodiments, the circuitry further includes a common mode choke operably coupled between the variable delay driver and the communication bus. In some embodiments, the communication bus includes an unshielded twisted pair (UTP). In some embodiments, the circuitry further includes a Manchester encoder operably coupled to the driver input.

Some embodiments disclosed herein include circuitry of a physical layer of a wired local area network. The circuitry includes receiver circuitry operably coupled to a communication bus and a common mode dimmer operably coupled to the receiver circuitry and the communication bus. The common mode dimmer is configured to protect the receiver circuitry from common mode interference. In some embodiments, the common mode dimmer includes a differential amplifier and a common mode dimmer cell operably coupled to the differential amplifier. In some embodiments, the circuitry further includes transmit circuitry including a variable delay driver operably coupled to the communication bus. In some embodiments, the circuitry further includes one or more resistors coupled between the common mode dimmer and the communication bus.

Some embodiments disclosed herein include circuitry of a physical layer of a wired local area network. The circuitry includes a variable delay driver operably coupled to a communication bus. The variable delay driver is configured to control a slew rate of a driven transmit signal at the driver output. The circuitry also includes receiver circuitry operably coupled to the communication bus. The circuitry further includes a common mode dimmer operably coupled to the receiver circuitry and the communication bus. The common mode dimmer is configured to protect the receiver circuitry from common mode interference. In some embodiments, the circuitry further includes a common mode choke operably coupled between the communication bus and the variable delay driver, the common mode dimmer, and the receiver circuitry. In some embodiments, the common mode choke is configured to suppress the common mode interference on the communication bus. In some embodiments, the circuitry further includes a Manchester encoder operably coupled to a driver input of the variable delay driver. In some embodiments, the circuitry further includes one or more capacitors operably coupled between the communication bus and the variable delay driver, the receiver circuitry, and the common mode dimmer. In some embodiments, the one or more capacitors are configured to isolate the variable delay driver, the receiver circuitry, and the common mode dimmer from direct current voltages on the communication bus.

Figure 1:
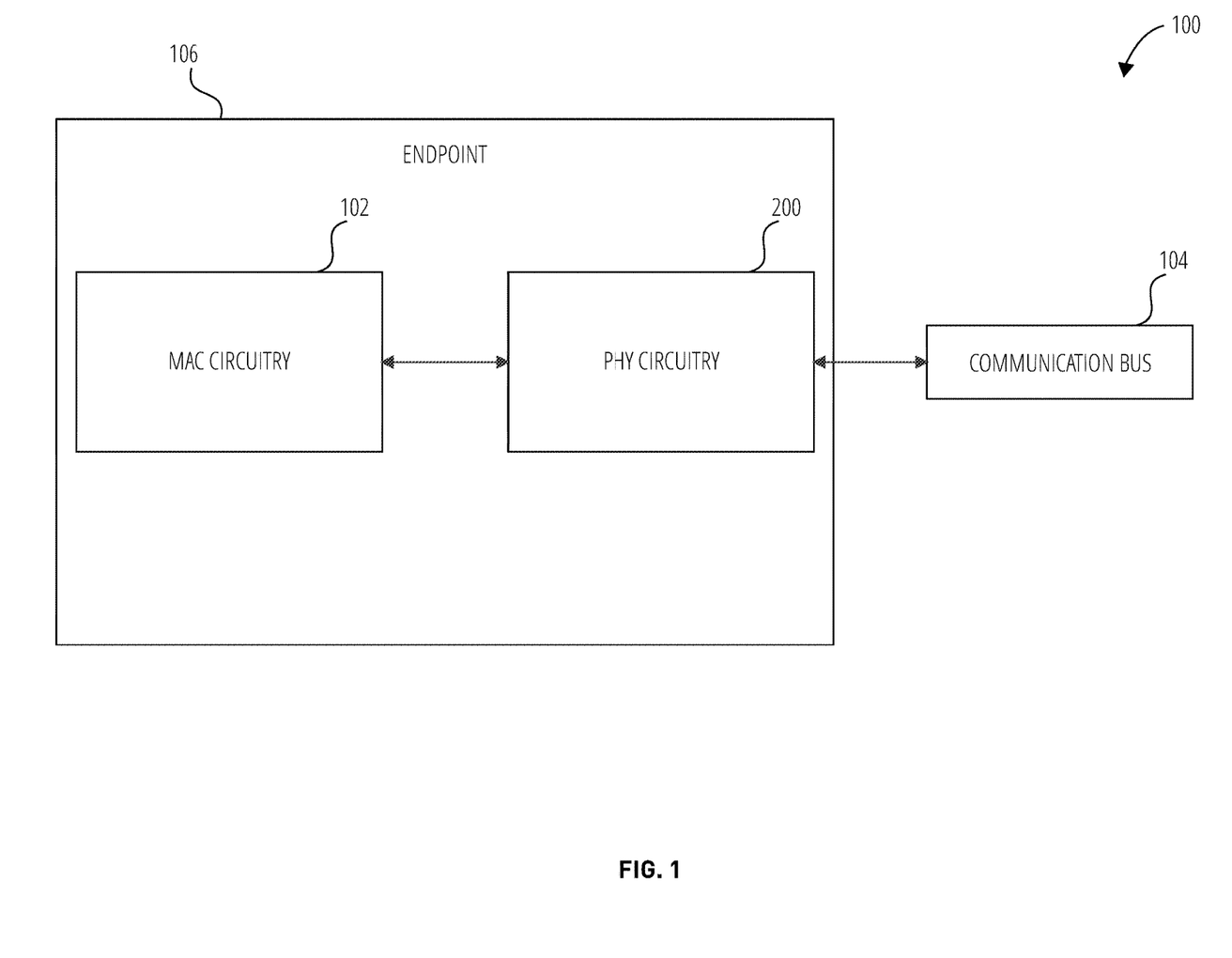
FIG. 1 is a block diagram of a portion of a wired local area network, according to some embodiments.

FIG. 1 is a block diagram of a portion of a wired local area network 100, according to some embodiments. The wired local area network 100 includes an endpoint 106 operably coupled to a communication bus 104. The communication bus 104 includes a shared transmission medium (e.g., a single twisted pair) of the wired local area network 100. As used herein, the term "shared transmission medium" refers to a wired transmission medium, such as a single twisted pair, that conducts both transmit signals and receive signals over the same conductive structure (e.g., wires). The endpoint 106 is configured to communicate via the communication bus 104. While connected to the wired local area network 100, the endpoint 106 functions as a node of the wired local area network 100.

The endpoint 106 includes physical layer circuitry 200 operably coupled to media access control (MAC) circuitry 102 and the communication bus 104. The physical layer circuitry 200 is configured to serve as an interface for a physical connection between the MAC circuitry 102 and a network or device connected to the physical layer circuitry 200 through the communication bus 104. In some embodiments the physical layer circuitry 200 includes at least a portion of Ethernet physical layer circuitry.

The wired local area network 100 may be used in an automotive environment in some embodiments. By way of non-limiting example, the wired local area network 100 may be configured to connect one or more sensors in a vehicle to a computer or controller.

Figure 2:
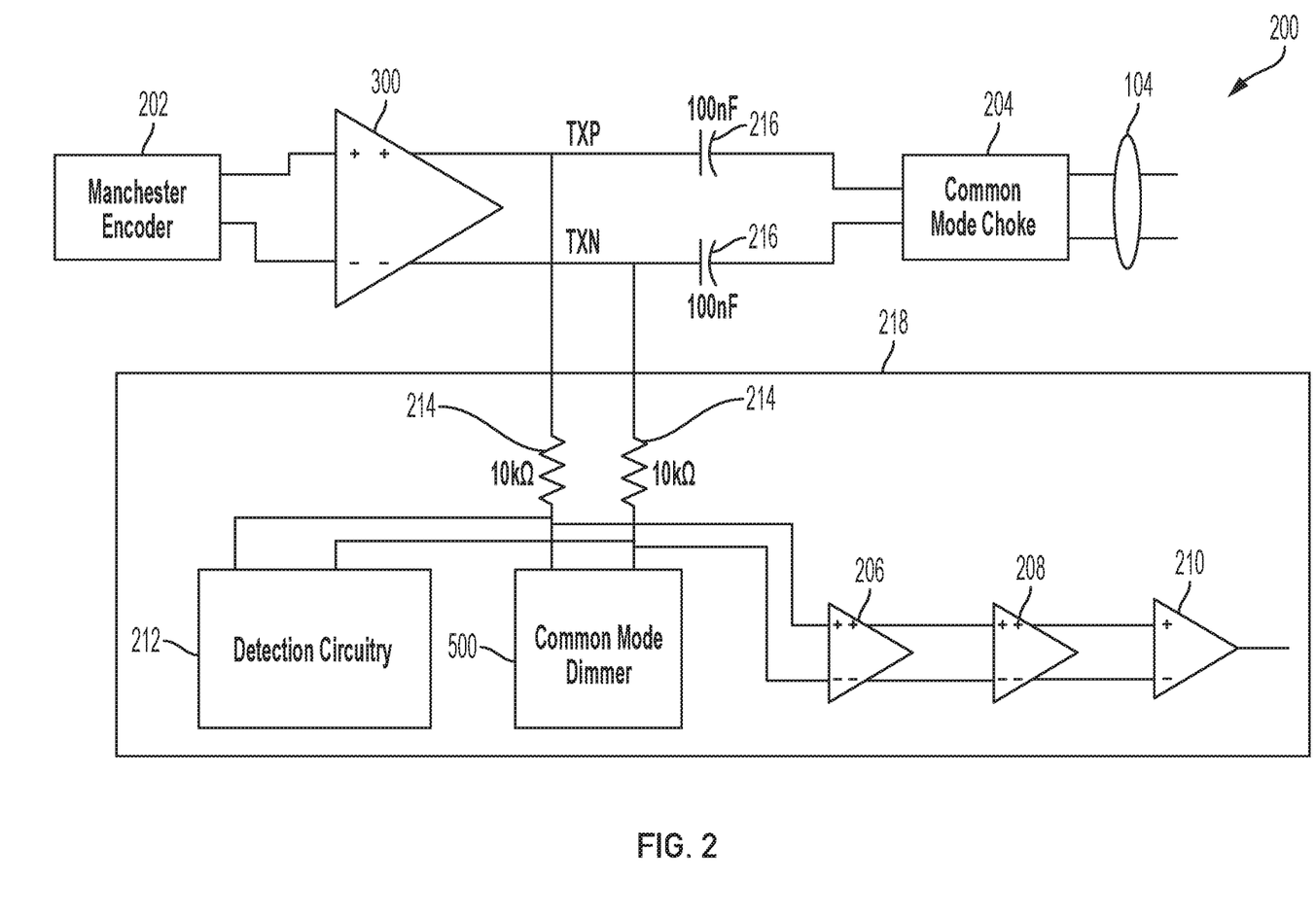
FIG. 2 is a schematic illustration of an example of physical layer circuitry of the wired local area network of FIG. 1.

FIG. 2 is a schematic illustration of an example of physical layer circuitry 200 of the wired local area network 100 of FIG. 1. The physical layer circuitry 200 includes transmitter circuitry including a Manchester encoder 202 and a variable delay driver 300; receiver circuitry 218 including detection circuitry 212 and receive amplifiers 206, 208, 210; and interference/noise compensation circuitry including a common mode dimmer 500, a common mode choke 204, resistors 214 (e.g., 10 kiloOhm (kΩ) resistors), and capacitors 216 (e.g., 100 nanoFarad (nF) capacitors). The transmitter circuitry and the receiver circuitry 218 are both connected to the same communication bus 104. As a result, the communication bus 104 may be used for both transmitting and receiving data. In some embodiments, the communication bus 104 may include a single twisted pair (e.g., an Unshielded Twisted Pair, or UTP).

The variable delay driver 300 is configured to drive signals provided to the variable delay driver 300 by the Manchester encoder 202 to differential outputs TXP, TXN of the variable delay driver 300. The variable delay driver 300 is also configured to control a slew rate and an amplitude (e.g., different output swing levels) of a driver output of the variable delay driver 300. The variable delay driver 300 is also configured to tolerate high interference (e.g., common mode interference on the order of +/−40 volts or more) and noise received through the communication bus 104 at a driver output of the variable delay driver 300. The variable delay driver 300 is also configured to protect itself from high input voltage at a driver input of the variable delay driver 300. Since the 10SPE EMI standards for emissions are relatively stringent, the slew rate of the driver output of the variable delay driver 300 may be decreased to reduce high-frequency components of a driven transmit signal provided at the driver output of the variable delay driver 300. The reduction of high-frequency components in the driven transmit signal at the driver output may result in reduced overall emissions of the physical layer circuitry 200. Also, the interference/noise tolerance and input voltage protection enable the variable delay driver 300 to operate in the noisy and interference prone environment of an automobile. These characteristics of the variable delay driver 300 make the variable delay driver 300 suitable for the automotive environment. More detail regarding the physical layer circuitry 200 is disclosed below with reference to FIG. 3 and FIG. 4.

The common mode dimmer 500 is configured to protect sensitive receive circuitry (e.g., the detection circuitry 212 and the receive amplifiers 206, 208, 210) from interference (e.g., common mode interference) and noise received from the communication bus 104 during Bulk Current Injection (BCI) conditions. For example, the common mode dimmer 500 is configured to draw sufficient current through the resistors 214 to remove dangerously high common mode interference and cause a voltage of signals received through the communication bus 104 to drop to a safe level at the receiver circuitry 218. By way of non-limiting example, the common mode dimmer 500 may be configured to maintain the voltage of signals reaching the receiver circuitry 218 to remain lower than a high power rail of the receiver circuitry 218 (e.g., 3.3 V). The common mode dimmer 500 enables the use of high gain receivers (e.g., receive amplifiers 206, 208, 210) and signal/pulse/collision detectors (e.g., detection circuitry 212) in the receiver circuitry 218, filters out common mode interference signals, and results in low jitter and low power expenditure. More detail regarding the common mode dimmer 500 will be discussed below with reference to FIG. 5. In some embodiments, the common mode dimmer 500 may be used for low power applications.

The detection circuitry 212 may include signal detect circuitry, reflection detect circuitry, sleep mode detect circuitry, collision detect circuitry, other circuitry, or combinations thereof. The signal detect circuitry may be configured to detect signals received through the communication bus 104. The reflection detect circuitry may be configured to diagnose the communication bus 104 (e.g., by detecting short circuits, open circuits, other issues, or combinations thereof on the communication bus 104). The sleep mode detect circuitry may be configured to trigger the receiver circuitry 218 to sleep or wake up responsive to sleep or wake messages received via the communication bus 104. The collision detect circuitry may be configured to detect signal collisions on the communication bus 104. Signal and activity detection may also be implemented.

To provide additional interference/noise protection, the common mode choke 204 is configured to reduce (e.g., suppress) common mode interference received through the communication bus 104, and the capacitors 216 are configured to filter out direct current (DC) components of signals received from the communication bus 104.

Figure 3:
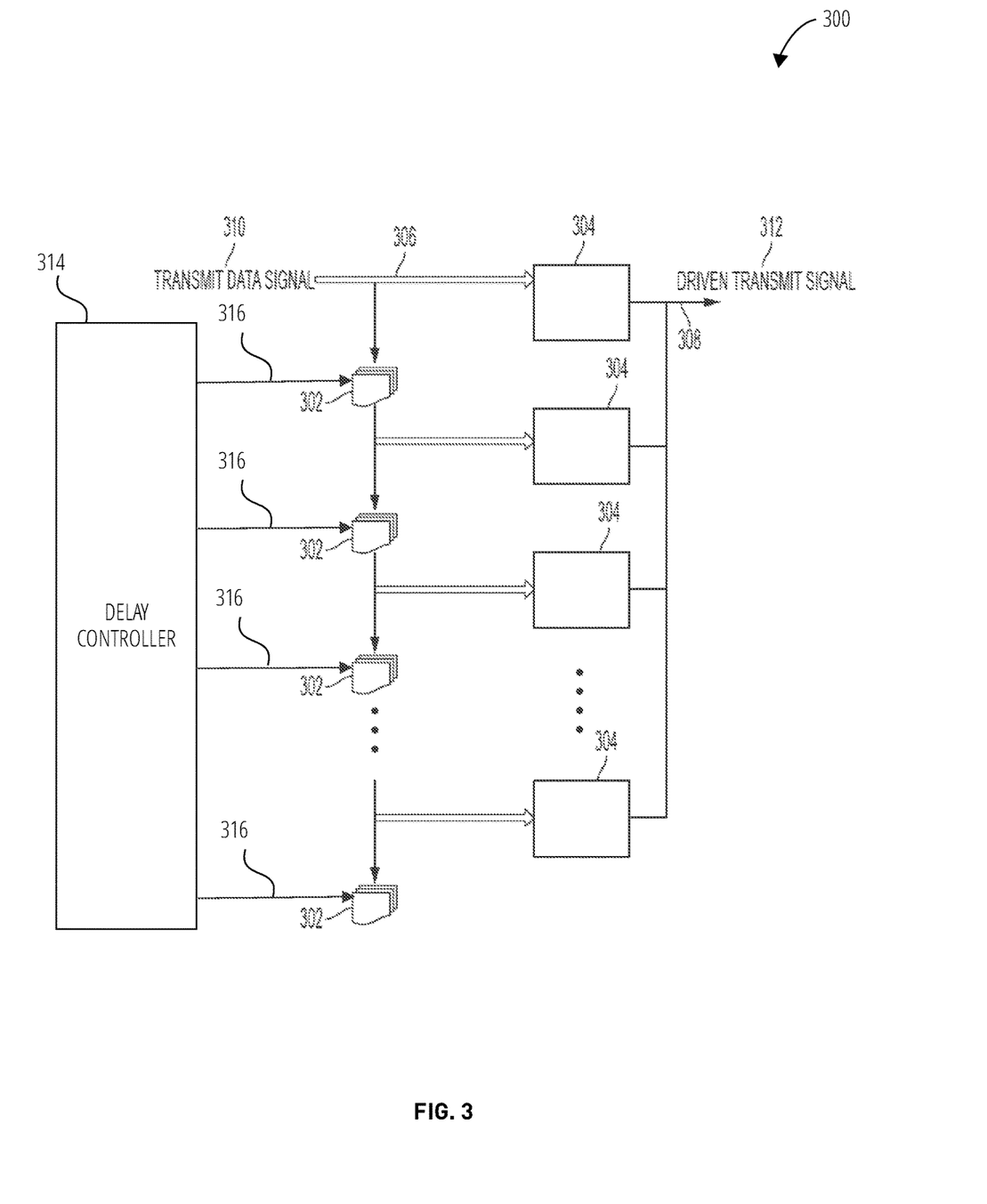
FIG. 3 is a schematic illustration of an example of a variable delay driver of the physical layer circuitry of FIG. 2.

FIG. 3 is a schematic illustration of an example of the variable delay driver 300 of the physical layer circuitry 200 of FIG. 2. The variable delay driver 300 includes a plurality of sub-drivers 304 operably coupled in parallel between a driver input 306 and a driver output 308. The variable delay driver 300 also includes one or more delay elements 302 coupled between the driver input 306 and one or more of the sub-drivers 304 to deliver an input transmit data signal 310 to at least two of the sub-drivers 304 at different points in time to control a slew rate of a driven transmit signal 312 at the driver output 308. Each one of the sub-drivers 304 and its corresponding one of the delay elements 302, if applicable (e.g., a first one of the sub-drivers 304 may or may not have a corresponding one of the delay elements 302), may be referred to as a "stage."

The variable delay driver 300 also includes a delay controller 314 configured to control how much delay is induced by the delay elements 302. For example, the delay controller 314 may be configured to provide a plurality of delay signals 316 to the plurality delay elements 302. The plurality of delay elements 302 may be each be controllable to set an amount of delay induced thereby. By way of non-limiting example, the delay signals 316 may include two-bit signals configured to set the delay of the corresponding delay elements to any one of four different delay values (e.g., 0 delay, 7.5 nanoseconds (ns) delay, 15 ns delay, 15 ns delay, or 25 ns delay). It will be understood that more than two bits of the delay signals 316 would allow for a larger number of different delay values to be signaled to the delay elements 302. As specific, non-limiting examples, the delay induced by the delay elements 302 may follow a constant delay pattern, delay that follows a raised cosine shape, or combinations thereof. The outputs of each stage may be summed together to create the driven transmit signal 312.

In the embodiment illustrated in FIG. 3, the delay elements 302 cause the sub-drivers 304 to receive the transmit data signal 310 at a different point in time. As a result, at the driver output 308, each of the sub-drivers 304 will start to drive a new received bit at a staggered point in time relative to the others. This staggering in the driving of the driven transmit signal 312 results in a reduced slew rate as compared to a slew rate that would result from not staggering the driving. The reduced slew rate eliminates higher-frequency components of the driver output 308, which have a tendency to result in EMI emissions. Consequently, the variable delay driver 300 results in lower EMI emissions as compared to drivers that do not use staggered driving. The use of stages, as in the variable delay driver 300 of FIG. 3, may also enable different delay and different current level control.

Each stage may also include steered current with a raised cosine or a constant value. As a result, in addition to slew rate control, the variable delay driver 300 is also capable of amplitude control at its driver output 308. More detail regarding the steered current and the controllable amplitude will be discussed below with reference to FIG. 4.

Figure 4:
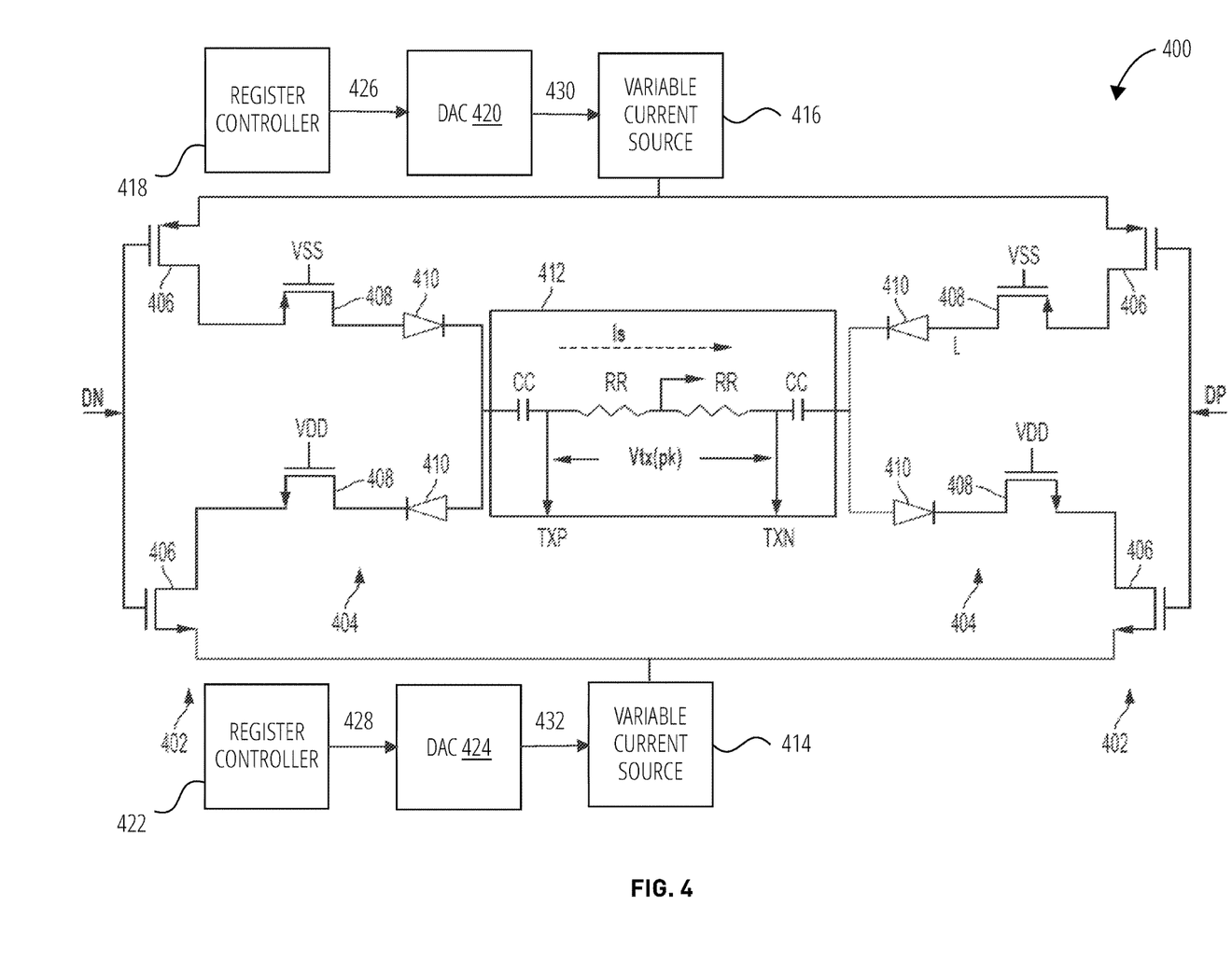
FIG. 4 is a schematic illustration of an example of a sub-driver of the variable delay driver of FIG. 3.

FIG. 4 is a schematic illustration of an example of a sub-driver 400 of the variable delay driver 300 of FIG. 3. As can be seen in FIG. 4, current in the sub-driver 400 is switched by differential data. The sub-driver 400 is configured to protect the data and tolerate high common mode surges on outputs OUTP, OUTN of the sub-driver 400, which are operably coupled to the communication bus 104. These surges may be received from the communication bus 104 (FIG. 2). The sub-driver 400 includes a high-speed input stage 402 for each input DN, DP and a high-voltage intermediate stage 404 for each input DN, DP. The high-speed input stage 402 includes data switches including high-speed transistors 406, and the high-voltage intermediate stage 404 includes high-voltage transistors 408 cascaded with the high-speed transistors 406 and protection diodes 410 cascaded with the high-voltage transistors 408. The design of transistors involves tradeoffs between device speed and tolerance to high voltage (e.g., devices with relatively small dimensions tend to operate relatively faster but have relatively poorer voltage tolerance as compared to devices with relatively large dimensions). Accordingly, as used herein, the terms "high-speed transistor" and "high-voltage transistor," as used herein, acknowledge these design tradeoffs. The term "high-speed transistor," as used herein, is a transistor that switches on and off faster than a "high-voltage transistor." Also, as used herein, a "high-voltage transistor" is a transistor that can tolerate higher voltages potential differences at its terminals than a "high-speed transistor." As a result, the sub-driver 400 can switch at the relatively higher speeds afforded by the high-speed input stage 402 without sacrificing the relatively higher voltage protection to the devices and the data afforded by the high-voltage intermediate stage 404. As a result, the sub-driver 400 can tolerate high common mode surges on the communication bus 104 (FIG. 2), which may be operably coupled to the outputs OUTP, OUTN. In some embodiments, amplitude may be controlled by a Digital to Analog Converter (DAC).

The sub-driver 400 may also include circuit components 412 including capacitors CC (e.g., 100 nF capacitors) in series with resistors RR (e.g., 25Ω resistors) between the capacitors CC. By way of non-limiting example, the circuit components 412 may be off-chip circuit components (e.g., discrete capacitors and resistors configured to be soldered to a printed circuit board). In operation, a current Is may pass through the capacitors CC and resistors RR. In some embodiments, a terminal between the resistors RR may be grounded (zero volts). As a result, a peak-to-peak voltage across output terminals TXP, TXN of the sub-driver 400 (e.g., measured across the resistors RR of the circuit components 412) may be given by Vtx(pk)=Is*(50Ω), where RR=25Ω. In some embodiments, Is may vary from 2.5 milliAmps (mA) to 15 mA. By way of non-limiting example, where Is=10 mA, Vtx(pk) may be about 1 Volt peak-to-peak (where the terminal between the resistors RR is grounded).

As Vtx(pk) is a function of the current Is, an amplitude of the output of the sub-driver 400 may be controlled if Is is controlled. As a result, the sub-driver 400 includes one or more variable current sources 414, 416 configured to control the current Is. By way of non-limiting example, the variable current source 414 may include an NMOS variable current source and the variable current source 416 may include a PMOS variable current source. In some embodiments the variable current sources 414, 416 may be controlled by register controllers 422, 418, respectively. The register controllers 422, 418 may be configured to output voltage signals 428, 426, respectively, corresponding to desired voltage amplitude values for Vtx(pk) between output terminals TXP and TXN. The variable current sources 414, 416 are configured to conduct an appropriate current Is to accomplish the desired voltage amplitude Vtx(pk) at the output terminals TXP, TXN. In embodiments where the variable current sources 414 are controlled by analog inputs and the register controllers 422, 418, respectively, provide digital voltage signals 428, 426, respectively, the sub-driver 400 may include one or more Digital to Analog Converters (DACs) 420, 424. The DACs 420, 424 are configured to convert the voltage signals 428, 426 to analog voltage signals 432, 430, which are provided to the variable current sources 414, 416, respectively. By way of non-limiting example, the register controllers 422, 418 may be configured to control the variable current sources 414, 416 with three bit voltage signals 428, 426 corresponding to eight or less different voltage amplitude levels for Vtx(pk). In a specific, non-limiting example, the voltage signals 428, 426 may selectively indicate 250 mV, 500 mV, 750 mV, 1V, 1.25 V, or 1.5 V.

Figure 5:
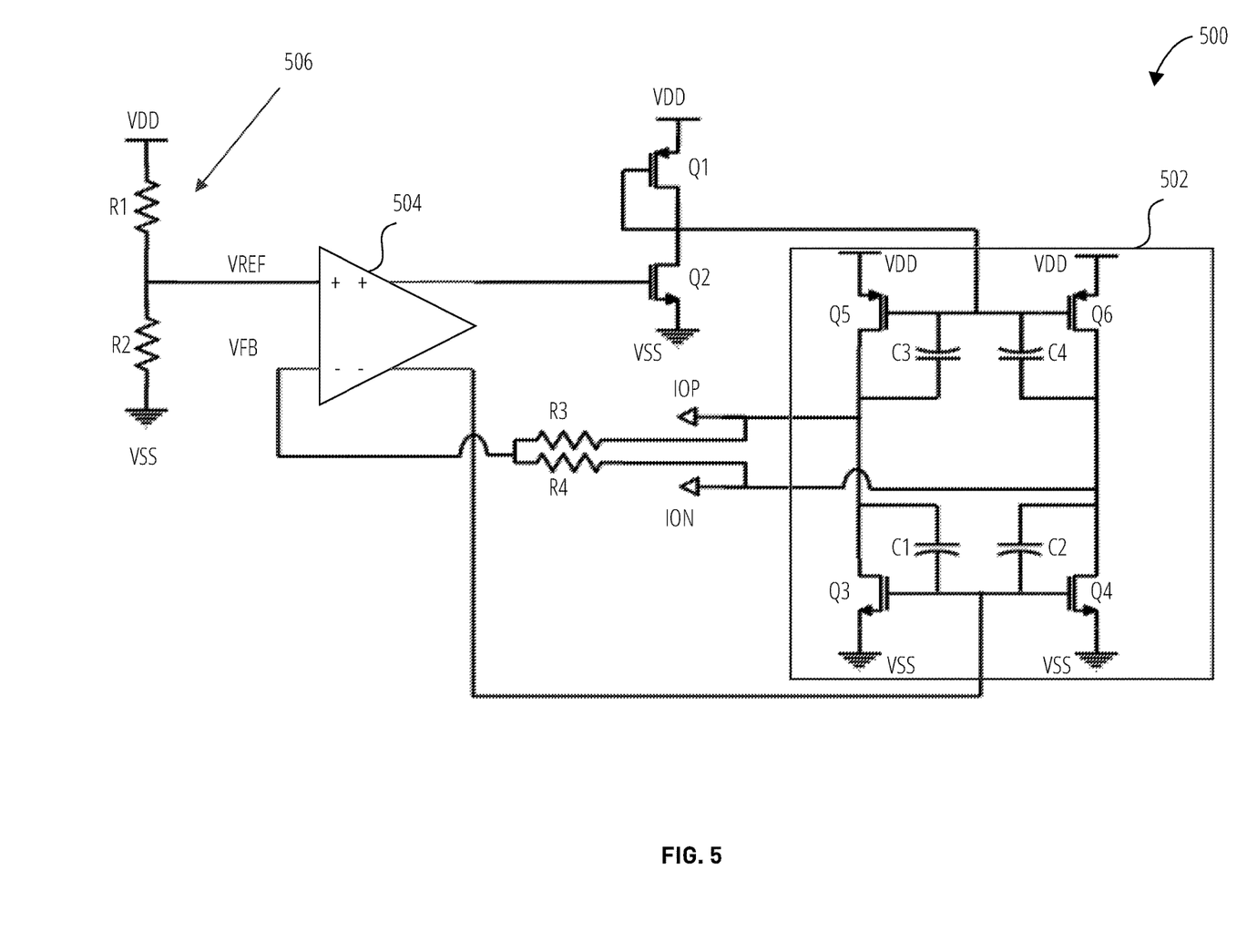
FIG. 5 is a schematic illustration of an example of a common mode dimmer of the circuitry of FIG. 2.

FIG. 5 is a schematic illustration of an example of a common mode dimmer 500 of the physical layer circuitry 200 of FIG. 2. The common mode dimmer is configured to enable the receiver circuitry 218 of the physical layer circuitry 200 to tolerate high common mode interference under BCI conditions, implement common mode interference signal filtering, implement low jitter, and draw low power. The common mode dimmer 500 includes a common mode dimmer cell 502 operably coupled to a differential amplifier 504. The common mode dimmer 500 operably couples to the resistors 214 of the physical layer circuitry 200 of FIG. 2 at the IOP and ION terminals of the common mode dimmer 500 of FIG. 5.

The common mode dimmer 500 also include voltage reference circuitry 506 operably coupled to a non-inverting input terminal of the differential amplifier 504. The voltage reference circuitry 506 is configured to provide a reference voltage VREF to the non-inverting input terminal of the differential amplifier 504. By way of non-limiting example, the voltage reference circuitry 506 may include a voltage divider circuit including a resistor R1 and a resistor R2 in series between a high rail voltage potential VDD and a low rail voltage potential VSS, such as that illustrated in FIG. 5.

The values of the resistors R1, R2 may be selected to set the reference voltage VREF to a desired level.

The common mode dimmer 500 is configured to maintain voltages at the IOP and ION terminals, which are operably coupled to the receiver circuitry 218 of FIG. 2, to be less than or equal to the reference voltage VREF. In some embodiments, the reference voltage VREF may be selected to be a high rail voltage (VDD) of the receiver circuitry 218. In some embodiments, the common mode dimmer 500 is configured to maintain voltages at the IOP and ION terminals greater than or equal to a low rail voltage VSS (e.g., ground) of the receiver circuitry 218.

An inverting input of the differential amplifier 504 is operably coupled to the IOP and ION terminals of the common mode dimmer through feedback resistors R3, R4, respectively. As a result, a feedback voltage VFB received at the inverting input of the differential amplifier 504 is controlled by signal levels of the communication bus 104 of FIG. 2. In other words, the communication bus 104 is operably coupled to the inverting input of the differential amplifier through two pairs of resistors (R3 and R4; the resistors 214 of FIG. 2).

A non-inverting output of the differential amplifier 504 is operably coupled to a gate of transistor Q2, which is operably coupled in series with transistor Q1 between the high rail voltage potential VDD and the low rail voltage potential. A gate of transistor Q1 is operably coupled to drains of transistors Q1 and Q2, and to gates of transistors Q5 and Q6 of the common mode dimmer cell 502. Transistor Q5 of the common mode dimmer cell 502 is operably coupled in series with transistor Q3 between VDD and VSS, and transistor Q6 is operably coupled in series with transistor Q4 between VDD and VSS. Drains of transistors Q5 and Q3 are operably coupled to the IOP terminal and drains of transistors Q6 and Q4 are operably coupled to the ION terminal. In other words, common mode dimmer cell 502 includes two pairs of transistors (Q3 and Q5; Q4 and Q6), each pair of the two pairs of transistors coupled in series between a high rail voltage potential and a low rail voltage potential. Gates of transistors Q3 and Q4 are operably coupled to an inverting output of the differential amplifier 504. The common mode dimmer cell 502 further includes capacitors C1, C2, C3, and C4 coupled between gates and drains of transistors Q3, Q4, Q5, and Q6, respectively.

As illustrated in FIG. 5, transistors Q1, Q5, and Q6 are p-type transistors (e.g., P-type Metal Oxide Semiconductor (PMOS) transistors) and transistors Q2, Q3, and Q4 are n-type transistors (e.g., N-type Metal Oxide Semiconductor (NMOS) transistors). If a high common mode interference voltage potential (i.e., greater than the reference voltage VREF) is received at the IOP and ION terminals, the voltage potential VFB at the inverting input of the differential amplifier 504 will be higher than the reference voltage VREF at the non-inverting input of the differential amplifier 504. As a result, the differential amplifier 504 drives its non-inverting output to a logic level low and its inverting output to a logic level high. In consequence, the gates of transistors Q3 and Q4 are driven high, turning transistors Q3 and Q4 on, and conducting current from the IOP and ION terminals to VSS terminals. As current is conducted from the IOP and ION terminals, voltage drops across resistors 214 (FIG. 2) increase, pulling the voltage potentials at terminals IOP and ION down to VREF.

If, on the other hand, a low common mode interference voltage potential (i.e., less than VSS) is received at the IOP and ION terminals, the voltage potential VFB at the inverting input of the differential amplifier 504 will be lower than the reference voltage VREF at the non-inverting input of the differential amplifier 504. As a result, the differential amplifier 504 drives its non-inverting output to a logic level high and its inverting output to a logic level low. In consequence, the gates of transistors Q5 and Q6 are driven low, turning transistors Q5 and Q6 on, and conducting current from the IOP and ION terminals to VDD. As current is conducted from the IOP and ION terminals, voltage drops across resistors 214 (FIG. 2) increase in magnitude (i.e., larger negative voltage drops), pulling the voltage potentials at terminals IOP and ION up to at least VSS.

Figure 6:
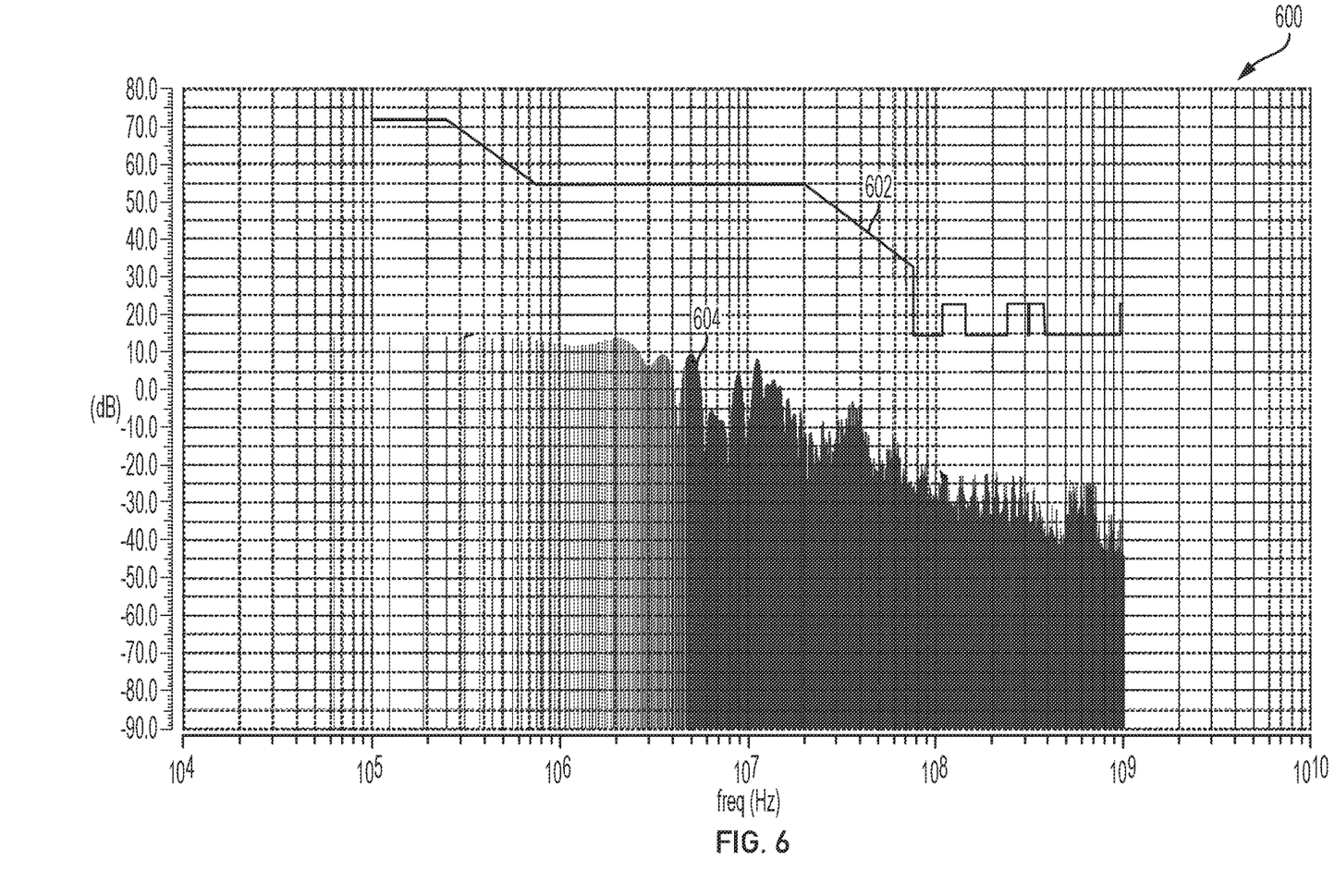
FIG. 6 illustrates simulated EMI emissions plots resulting from the circuitry of FIG. 2, according to some embodiments.

FIG. 6 illustrates simulated EMI emissions plots 600 resulting from the physical layer circuitry 200 of FIG. 2, according to some embodiments. The EMI emissions plots 600 includes a plot of an emission mask 602, according to a standard specification, and a plot of a simulated emission spectrum 604 resulting from the physical layer circuitry 200. As can be seen, the emission spectrum 604 is well within the emission mask 602.

Figure 7:
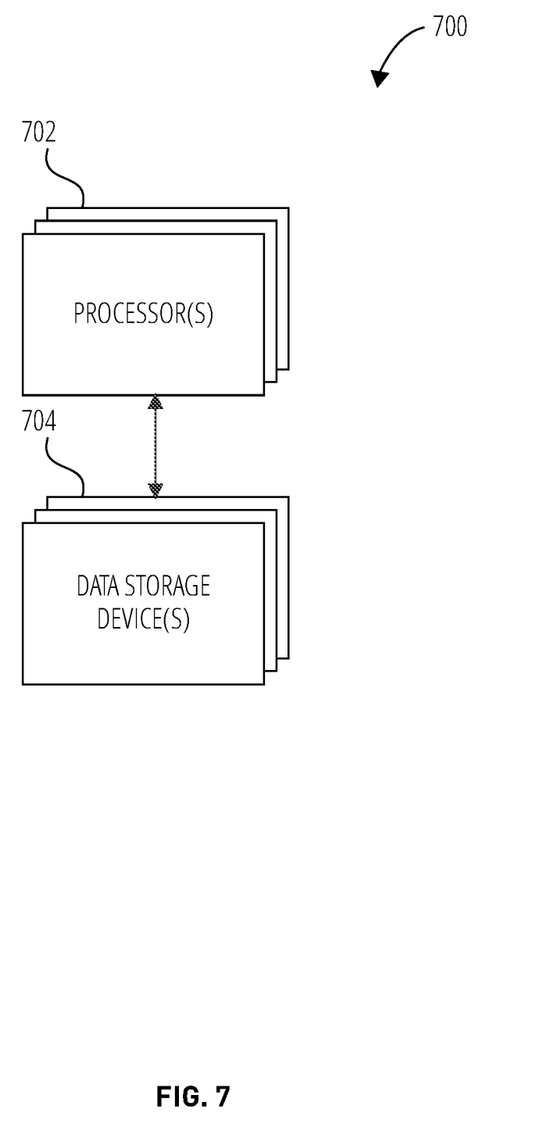
FIG. 7 is a block diagram of a computing device that may be used in some embodiments.

FIG. 7 is a block diagram of a computing device 700 that may be used in some embodiments. The computing device 700 includes one or more processors 702 (sometimes referred to herein as "processors" 702) operably coupled to one or more data storage devices 704 (sometimes referred to herein as "storage" 704). The storage 704 includes computer-readable instructions stored thereon. The computer-readable instructions are configured to instruct the processors 702 to perform operations of embodiments disclosed herein. For example, the computer-readable instructions may be configured to instruct the processors 702 to perform at least a portion or a totality of the operations discussed for the physical layer circuitry 200 (FIG. 1 and FIG. 2), the variable delay driver 300 (FIG. 2 and FIG. 3), the sub-driver 400 (FIG. 4), the common mode dimmer 500 (FIG. 5), or combinations thereof.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Examples

A non-exhaustive, non-limiting list of example embodiments follows. Not each of the example embodiments listed below are individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: Physical layer circuitry for interfacing with a communication bus of a wired local area network, the physical layer circuitry comprising: a variable delay driver operably coupled to a communication bus comprising a shared transmission medium, the variable delay driver including: a plurality of sub-drivers operably coupled in parallel between a driver input of the variable delay driver and a driver output of the variable delay driver; one or more delay elements operably coupled between the driver input and one or more of the plurality of sub-drivers to deliver a transmit data signal to at least two of the sub-drivers at different points in time to control a slew rate of a driven transmit signal at the driver output.

Example 2: The physical layer circuitry of Example 1, wherein at least one of the plurality of sub-drivers includes a high-speed input stage and a high-voltage intermediate stage.

Example 3: The physical layer circuitry of Example 2, wherein the high-speed input stage includes high-speed transistors.

Example 4: The physical layer circuitry according to any one of Examples 2 and 3, wherein the high-voltage intermediate stage includes high-voltage transistors and diodes.

Example 5: The physical layer circuitry according to any one of Examples 1-4, further comprising receiver circuitry operably coupled to the communication bus.

Example 6: The physical layer circuitry of Example 5, wherein the receiver circuitry includes detection circuitry.

Example 7: The physical layer circuitry of Example 6, wherein the reflection detect circuitry is configured to detect shorts, open circuits, or both in the communication bus.

Example 8: The physical layer circuitry according to any one of Examples 5-7, wherein the receiver circuitry includes at least one receive amplifier.

Example 9: The physical layer circuitry according to any one of Examples 5-8, further comprising a common mode dimmer configured to protect the receive circuitry from common mode interference.

Example 10: The physical layer circuitry of Example 9, wherein the common mode dimmer includes a differential amplifier operably coupled to a common mode dimmer cell, the differential amplifier configured drive the common mode dimmer cell to pull down excessively high common mode interference and pull up excessively low common mode interference at the receiver circuitry.

Example 11: The physical layer circuitry according to any one of Examples 1-10, further comprising a common mode choke operably coupled between the variable delay driver and the communication bus.

Example 12: The physical layer circuitry according to any one of Examples 1-11, further comprising a Manchester encoder operably coupled to the driver input.

Example 13: Circuitry of a physical layer for interfacing with a communication bus of a wired local area network, the circuitry comprising: receiver circuitry operably coupled to a communication bus, the communication bus including a shared transmission medium; and a common mode dimmer operably coupled to the receiver circuitry and the communication bus, the common mode dimmer configured to protect the receiver circuitry from common mode interference.

Example 14: The circuitry of Example 13, wherein the common mode dimmer comprises: a differential amplifier; and a common mode dimmer cell operably coupled to the differential amplifier.

Example 15: The circuitry of Example 14, wherein the communication bus is operably coupled to an inverting input of the differential amplifier.

Example 16: The circuitry of Example 15, wherein the communication bus is operably coupled to the inverting input of the differential amplifier through two pairs of resistors.

Example 17: The circuitry according to any one of Examples 14-16, further comprising voltage reference circuitry operably coupled to a non-inverting input of the differential amplifier, the voltage reference circuitry configured to provide a reference voltage to the non-inverting input of the differential amplifier.

Example 18: The circuitry of Example 17, wherein the common mode dimmer is configured to maintain voltage levels at the receiver circuitry at or below the reference voltage.

Example 19: The circuitry according to any one of Examples 14-18, wherein the common mode dimmer cell includes two pairs of transistors, each pair of the two pairs of transistors coupled in series between a high rail voltage potential and a low rail voltage potential.

Example 20: The circuitry of Example 19, wherein drains of a first pair of transistors of the two pairs of transistors are operably coupled to a first input terminal of the common mode dimmer and drains of a second pair of transistors of the two pairs of transistors are operably coupled to a second input terminal of the common mode dimmer.

Example 21: The circuitry according to any one of Examples 19 and 20, wherein gates of N-type Metal Oxide Semiconductor transistors of the two pairs of transistors are operably coupled to an inverting output of the differential amplifier.

Example 22: The circuitry according to any one of Examples 19-21, wherein gates of P-type Metal Oxide Semiconductor (PMOS) transistors of the two pairs of transistors are operably coupled to a gate of another PMOS transistor, the other PMOS transistor operably coupled in series with an N-type Metal Oxide Semiconductor (NMOS) transistor between a high rail voltage potential and a low rail voltage potential, a gate of the NMOS transistor operably coupled to a non-inverting output of the differential amplifier.

Example 23: The circuitry according to any one of Examples 13-22, further comprising transmit circuitry including a variable delay driver operably coupled to the communication bus.

Example 24: The circuitry according to any one of Examples 13-23, further comprising one or more resistors coupled between the common mode dimmer and the communication bus.

Example 25: Circuitry of a physical layer for interfacing with a communication bus of a wired local area network, the circuitry comprising: a variable delay driver operably coupled to a communication bus comprising a shared transmission medium, the variable delay driver configured to control a slew rate of a driven transmit signal at the driver output; receiver circuitry operably coupled to the communication bus; and a common mode dimmer operably coupled to the receiver circuitry and the communication bus, the common mode dimmer configured to protect the receiver circuitry from common mode interference.

Example 26: The circuitry of Example 25, further comprising a common mode choke operably coupled between the communication bus and the variable delay driver, the common mode dimmer, and the receiver circuitry, the common mode choke configured to suppress the common mode interference on the communication bus.

Example 27: The circuitry according to any one of Examples 25-26, further comprising a Manchester encoder operably coupled to a driver input of the variable delay driver.

Example 28: The circuitry according to any one of Examples 25-27, further comprising one or more capacitors operably coupled between the communication bus and the variable delay driver, the receiver circuitry, and the common mode dimmer, the one or more capacitors configured to isolate the variable delay driver, the receiver circuitry, and the common mode dimmer from direct current voltages on the communication bus.

Example 29: The circuitry according to any one of Examples 25-28, wherein the variable delay driver is further configured to control an amplitude of voltage signals at a driver output of the variable delay driver.

Example 30: The circuitry according to any one of Examples 25-29, wherein the variable delay driver includes a plurality of sub-drivers, wherein at least one of the plurality of sub-drivers includes at least one variable current source configured to control an amount of current provided to the at least one of the plurality of sub-drivers, thereby controlling an amplitude of voltage signals at a driver output of the variable delay driver.

CONCLUSION

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. Physical layer circuitry for interfacing with a communication bus of a wired local area network, the physical layer circuitry comprising:
    a variable delay driver operably coupled to the communication bus, the communication bus comprising a shared transmission medium, the variable delay driver including:
        a plurality of sub-drivers operably coupled in parallel between a driver input of the variable delay driver and a driver output of the variable delay driver, the variable delay driver configured to provide a driven transmit signal comprising a driven version of a transmit data signal at the driver output; and
        one or more delay elements operably coupled between the driver input and one or more of the plurality of sub-drivers to deliver the transmit data signal to at least two of the sub-drivers at different points in time to control a slew rate of the driven transmit signal at the driver output.

2. The physical layer circuitry of claim 1, wherein at least one of the plurality of sub-drivers includes an input stage and an intermediate stage.

3. The physical layer circuitry of claim 2, wherein the input stage includes transistors that switch on and off faster than transistors of the intermediate stage.

4. The physical layer circuitry of claim 2, wherein the intermediate stage includes transistors that tolerate higher voltage potential differences at their terminals than transistors of the input stage.

5. The physical layer circuitry of claim 1, further comprising receiver circuitry operably coupled to the communication bus.

6. The physical layer circuitry of claim 5, wherein the receiver circuitry includes detection circuitry.

7. The physical layer circuitry of claim 6, wherein detection circuitry is configured to detect shorts, open circuits, or both in the communication bus.

8. The physical layer circuitry of claim 5, wherein the receiver circuitry includes at least one receive amplifier.

9. The physical layer circuitry of claim 5, further comprising a common mode dimmer configured to protect the receive circuitry from common mode interference.

10. The physical layer circuitry of claim 9, wherein the common mode dimmer includes a differential amplifier operably coupled to a common mode dimmer cell, the differential amplifier configured drive the common mode dimmer cell to pull down common mode interference and pull up the common mode interference at the receiver circuitry.

11. The physical layer circuitry of claim 1, further comprising a common mode choke operably coupled between the variable delay driver and the communication bus.

12. The physical layer circuitry of claim 1, further comprising a Manchester encoder operably coupled to the driver input.

13. Circuitry of a physical layer for interfacing with a communication bus of a wired local area network, the circuitry comprising:
    receiver circuitry operably coupled to the communication bus, the communication bus including a shared transmission medium; and
    a common mode dimmer operably coupled to the receiver circuitry and the communication bus, the common mode dimmer configured to protect the receiver circuitry from common mode interference, the common mode dimmer comprising:
        a differential amplifier; and
        a common mode dimmer cell operably coupled to the differential amplifier.

14. The circuitry of claim 13, wherein the communication bus is operably coupled to an inverting input of the differential amplifier.

15. The circuitry of claim 14, wherein the communication bus is operably coupled to the inverting input of the differential amplifier through two pairs of resistors.

16. The circuitry of claim 13, further comprising voltage reference circuitry operably coupled to a non-inverting input of the differential amplifier, the voltage reference circuitry configured to provide a reference voltage to the non-inverting input of the differential amplifier.

17. The circuitry of claim 16, wherein the common mode dimmer is configured to maintain voltage levels at the receiver circuitry at or below the reference voltage.

18. The circuitry of claim 13, wherein the common mode dimmer cell includes two pairs of transistors, each pair of the two pairs of transistors coupled in series between a first power rail voltage potential node and a second power rail voltage potential node, the first power rail voltage potential node higher than the second power rail voltage potential node, a first power rail voltage potential associated with the first power rail voltage potential node higher than a second power rail voltage potential associated with the second power rail voltage potential node.

19. The circuitry of claim 18, wherein drains of a first pair of transistors of the two pairs of transistors are operably coupled to a first input terminal of the common mode dimmer and drains of a second pair of transistors of the two pairs of transistors are operably coupled to a second input terminal of the common mode dimmer.

20. The circuitry of claim 18, wherein gates of N-type Metal Oxide Semiconductor transistors of the two pairs of transistors are operably coupled to an inverting output of the differential amplifier.

21. The circuitry of claim 18, wherein gates of P-type Metal Oxide Semiconductor (PMOS) transistors of the two pairs of transistors are operably coupled to a gate of an other PMOS transistor, the other PMOS transistor operably coupled in series with an N-type Metal Oxide Semiconductor (NMOS) transistor between the first power rail voltage potential node and the second power rail voltage potential node, a gate of the NMOS transistor operably coupled to a non-inverting output of the differential amplifier.

22. The circuitry of claim 13, further comprising transmit circuitry including a variable delay driver operably coupled to the communication bus.

23. The circuitry of claim 13, further comprising one or more resistors coupled between the common mode dimmer and the communication bus.

24. Circuitry of a physical layer for interfacing with a communication bus of a wired local area network, the circuitry comprising:
- a variable delay driver operably coupled to the communication bus comprising a shared transmission medium, the variable delay driver configured to control a slew rate of a driven transmit signal at a driver output;
- receiver circuitry operably coupled to the communication bus; and
- a common mode dimmer operably coupled to the receiver circuitry and the communication bus, the common mode dimmer configured to protect the receiver circuitry from common mode interference;

wherein:
- the variable delay driver is further configured to control an amplitude of voltage signals at a driver output of the variable delay driver;
- the variable delay driver includes a plurality of sub-drivers; and
- at least one of the plurality of sub-drivers includes at least one variable current source configured to control an amount of current provided to the at least one of the plurality of sub-drivers, thereby controlling an amplitude of voltage signals at a driver output of the variable delay driver.

25. The circuitry of claim 24, further comprising a common mode choke operably coupled between the communication bus and the variable delay driver, the common mode dimmer, and the receiver circuitry, the common mode choke configured to suppress the common mode interference on the communication bus.

26. The circuitry of claim 24, further comprising a Manchester encoder operably coupled to a driver input of the variable delay driver.

27. The circuitry of claim 24, further comprising one or more capacitors operably coupled between the communication bus and the variable delay driver, the receiver circuitry, and the common mode dimmer, the one or more capacitors configured to isolate the variable delay driver, the receiver circuitry, and the common mode dimmer from direct current voltages on the communication bus.

\* \* \* \* \*

UNITED STATES PATENT AND TRADEMARK OFFICE
CERTIFICATE OF CORRECTION

PATENT NO. : 11,074,209 B2  
APPLICATION NO. : 16/588562  
DATED : July 27, 2021  
INVENTOR(S) : Hongming An et al.

Page 1 of 1

It is certified that error appears in the above-identified patent and that said Letters Patent is hereby corrected as shown below:

In the Specification

| | | |
|---|---|---|
| Column 9, | Line 1, | change "Is" to --$I_s$-- |
| Column 9, | Line 7, | change "Is" to --$I_s$-- |
| Column 9, | Line 8, | change "Is" to --$I_s$-- |
| Column 9, | Line 10, | change "Is" to --$I_s$-- |
| Column 9, | Line 13, | change "current Is" to --current $I_s$-- |
| Column 9, | Line 14, | change "if Is" to --if $I_s$-- |
| Column 9, | Line 17, | change "Is" to --$I_s$-- |
| Column 9, | Line 27, | change "Is" to --$I_s$-- |

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*